| United States Patent [19] | [11] | 4,181,601 |
|---|---|---|
| Sze | [45] | Jan. 1, 1980 |

[54] FEED HYDROTREATING FOR IMPROVED THERMAL CRACKING

[75] Inventor: Morgan C. Sze, Upper Montclair, N.J.

[73] Assignee: The Lummus Company, Bloomfield, N.J.

[21] Appl. No.: 894,243

[22] Filed: Apr. 7, 1978

Related U.S. Application Data

[63] Continuation-in-part of Ser. No. 807,405, Jun. 17, 1977, abandoned.

[51] Int. Cl.$^2$ .................. C07C 11/04; C07C 5/10
[52] U.S. Cl. .................. 208/143; 208/48 R; 208/57; 585/266; 585/648
[58] Field of Search .......... 208/57, 61, 143, 108–112; 260/683 R, 667

[56] References Cited

U.S. PATENT DOCUMENTS

| 3,305,477 | 2/1967 | Peck et al. | 208/112 |
|---|---|---|---|
| 3,711,425 | 1/1973 | Suggitt et al. | 208/112 X |
| 3,781,195 | 12/1973 | Davis et al. | 208/143 X |
| 3,898,299 | 8/1975 | Jones | 260/683 R |
| 3,922,216 | 11/1975 | Wilson et al. | 208/73 |
| 3,944,481 | 3/1976 | Wing et al. | 208/61 |
| 4,065,379 | 12/1977 | Soonawala et al. | 208/67 |

FOREIGN PATENT DOCUMENTS 1361671  7/1974  United Kingdom .................. 208/61

Primary Examiner—Delbert E. Gantz
Assistant Examiner—G. E. Schmitkons
Attorney, Agent, or Firm—Marn and Olstein

[57] ABSTRACT

A pyrolysis feedstock, such as a gas oil feed, is hydrotreated in the presence of a bimetallic catalyst which has been promoted by the addition of chlorine and/or fluorine, preferably chlorine, followed by thermal cracking to increase the yields of light olefins and BTX.

12 Claims, No Drawings

FEED HYDROTREATING FOR IMPROVED THERMAL CRACKING

This application is a continuation-in-part of U.S. application Ser. No. 807,405 filed on June 17, 1977 now abandoned.

This invention relates to thermal cracking (pyrolysis) and more particularly to a process for improving the yields of light olefins and BTX (Benzene-Toluene-Xylene) from a thermal cracking feedstock.

In accordance with the present invention, a thermal cracking feedstock is hydrogenated in the presence of a bimetallic catalyst which includes added chlorine and/or fluorine followed by thermal cracking (non-catalytic) thereof. It has been found that pre-hydrogenation in the presence of such a promoted catalyst increases yields of light olefins and BTX, as compared to pre-hydrogenation in the presence of an unpromoted bimetallic catalyst.

The catalyst employed in the present invention is a bimetallic catalyst including at least one metal from Group VI and at least one metal from Group VIII of the Periodic Table. The Group VI metal is generally tungsten and/or molybdenum and the Group VIII metal is generally nickel and/or cobalt. The active form of the catalyst is the sulfided form and such sulfiding can be effected prior to use of the catalyst or, in situ, in that the feeds which are treated generally include sulfur. As representative examples of such catalysts, there may be mentioned tungsten-nickel sulfide, cobalt-molybdenum sulfide, nickel-molybdenum sulfide, etc. It is to be understood that the term bimetallic is employed in a generic sense to indicate at least two metals and, accordingly, encompasses catalysts which employ more than two metals.

The bimetallic catalyst may be supported on a suitable support, as known in the art. As representative examples of such supports, there may be mentioned: silica-alumina, various activated aluminas, silica-alumina containing zeolites, activated aluminas containing zirconium dioxide, titanium dioxide, etc; and the like.

The chlorine and/or fluorine may be added to the bimetallic catalyst to effect promotion thereof by contacting the catalyst with fluorine and/or chlorine, hydrogen chloride or a chloro-and/or fluoro-substituted organic compound. The chloro-and/or fluoro-substituted organic compound is preferably a chloro-and/or fluoro-substituted hydrocarbon. The chloro-and/or fluoro-substituted hydrocarbon may be an aliphatic, cycloaliphatic or aromatic hydrocarbon, and is preferably a saturated aliphatic hydrocarbon. As representative examples of such halo-substituted compounds, there may be mentioned: carbon tetrachloride, chloroform, dichloroethane, dichloro-difluoromethane, monochlorotrifluoromethane, chlorocyclopropane, tetrafluoromethane, etc. The selection of a particular compound is deemed to be within the scope of those skilled in the art from the teachings herein.

The bimetallic catalyst may be pretreated to effect the addition of chlorine and/or fluorine thereto; however, the preferred procedure is to treat the bimetallic catalyst, in situ, by adding a chloro-and/or fluoro-substituted hydrocarbon to the hydrocarbon feedstock. Thus, for example, a chloro and/or fluoro substituted hydrocarbon such as carbon tetrachloride, may be added to the pyrolysis feedstock which is to be pretreated, and the feedstock, including the carbon tetrachloride introduced into the pretreatment reactor. The reactor may be operated at a temperature slightly below the temperature to be employed in the subsequent hydrotreating and pretreatment is continued until the catalyst in the reactor retains the desired amount of chlorine. At this point, the reactor temperature is raised to the hydrotreating temperature for initiation of the hydrotreating operation. The feed to the hydrocracking reactor may also include the chloro and/or fluro substituted hydrocarbon in small amounts; for example, in parts per million, to compensate for any small amount of chlorine and/or fluorine which may be removed from the catalyst during the hydrocracking operation.

The bimetallic catalyst is treated to provide the catalyst with a promoting amount of chlorine and/or fluorine. In general, the catalyst is treated to provide a chlorine and/or fluorine content of at least 0.5 weight percent and preferably at least 1 weight percent, with the chlorine and/or fluorine content most preferably being at least 2.5 weight percent. In general, the chlorine and/or fluorine content does not exceed about 15 weight percent and preferably does not exceed about 10 weight percent. In most cases, it is not necessary for the chlorine and/or fluorine content to exceed 7.5 weight percent to obtain the desired results.

The feedstock which is treated in accordance with the present invention is a feedstock which when subjected to pyrolysis produces light olefins and mononuclear aromatics. In general, such a feedstock is characterized by an initial boiling point of at least 350° F. and a final end point of no greater than about 1100° F. The preferred feedstock is a gas oil fraction, with such gas oil fractions generally being derived from either petroleum, athabasca tar, shale or coal sources.

The hydrogenation is effected at a temperature of from 640° F. to 950° F., preferably 650° F. to 750° F. and a total pressure of from 750 to 2500 psig, preferably 900 to 1500 psig. In accordance with the present invention, it is possible to employ pressures which are lower than those employed with the untreated catalysts. Thus, although it is possible to use the higher pressures, such higher pressures are not required. Similarly, in accordance with the present invention, it is possible to employ lower temperatures than heretofore employed in the art. However, it is also possible to use the higher temperatures, although in general such higher temperatures are not required. In general, hydrogen is employed in an amount of from 1000 to 15,000 SCF/bbl, preferably from 3000 to 10,000 SCF/bbl. The liquid hourly space velocity is generally from 0.5 to 3.0 V/H/V, and preferably from 0.8 to 1.7 V/H/V.

The purpose of the hydrogenation is to alter the feed to increase the yield of mononuclear aromatics (in particular BTX) and ethylene in the subsequent thermal cracking, and such alteration is effected in a manner to prevent excessive hydrocracking. Some hydrocracking is effected to break naphthenic rings of polynuclear aromatics; however, such hydrocracking is limited in order to prevent excessive gas production. Thus, the hydrogenation is effected at mild conditions to saturate polynuclear aromatics and cause some ring rupture to mononuclear aromatics, without excessive gas formation. It has been found that the use of the promoted catalyst results in an improved hydrogenation to alter the feed structure to provide improved yields of BTX and light olefins in the subsequent thermal cracking, without effecting excessive hydrocracking to lighter molecular weight hydrocarbons. In most cases, the 400°–800° F. fraction present in the hydrogenated feed is no less than 85% of that present in the feed to the hydrogenation.

The hydrotreated feedstock is then thermally cracked at conditions known in the art. In general, such thermal cracking is effected at temperatures of greater than 1400° F., generally in the order of 1500° F. to 1800° F., and at residence times in the order of from 0.01 to 5 seconds, most generally 0.1 to 1 second. The thermal cracking is generally effected in the presence of steam, with the steam to hydrocarbon weight ratio generally being from 0.5:1 to 2.0:1 . Thermal cracking procedures ae known in the art and no further details in this respect are deemed necessary for a complete understanding of the present invention.

The invention will be further described with respect to the following example; however, the scope of the invention is not to be limited thereby:

EXAMPLE

Example 1

A raw Nigerian gas oil with inspections as shown under column I of Table I was pyrolyzed with a steam dilution of 1:1 by weight at maximum cracking severity . From the pyrolysis coil effluent, the following valuable products were obtained:
Ethylene: 20.2 wt%
Benzene: 5.1 wt%
Toluene: 3.1 wt%
$C_8$ Aromatics: 2.25 wt%
Also recovered is heavy +550° F. fuel oil amounting to 16.6 wt%.

Example 2

The same raw Nigerian gas oil was hydrotreated over a nickel molybdate on alumina catalyst under the following operating conditions:
Total pressure: 950 psig
Liquid hourly space velocity: 1.0
$H_2$/Oil SCF/bbl: 2500
Reactor average temp.: 685° F.

A 340° F. to END point hydrotreated gas oil was recovered. It has inspections shown under column II of Table I. The polynuclear aromatics content is reduced from 19.2 wt.% to 9.7% and the contents of paraffins and cycloparaffins are increased.

The hydrotreated gas oil is then pyrolyzed with a steam dilution of 1:1 by weight at maximum cracking severity. From the pyrolysis coil, the following valuable products are obtained:
Ethylene: 21.0 Wt.%
Benzene: 6.8 Wt%
Toluene: 4.4 Wt%
$C_8$ Aromatics: 2.7 Wt%

The recovered +550° F. heavy fuel oil is 13.7 Wt%.

Example 3

The same raw Nigerian gas oil as used in Example 1 was hydrotreated over a nickel molybdate on alumina catalyst with the catalyst loaded with a halogenated promoter such that the catalyst contained 2.5 Wt% chlorine. The operating conditions for the hydrotreating were as follows:
Total pressure: 950 psig
Liquid hourly space velocity: 1.0
$H_2$/Oil SCF/Bbl: 2500
Reactor average temp.: 689° F.
$CCl_4$ in feed, wt.%: 0.1

The hydrogreated gas oil recovered has inspections as shown under Column III of Table I. Compared with Example 2, the hydrotreating is done under the same conditions except with the $CCl_4$ promoter. The product has higher paraffins and lower polynuclear aromatics.

The recovered hydrotreated gas oil is then pryolyzed at a steam dilution of 1:1 by weight at the maximum severity. From the pyrolysis coil, the following valuable products are obtained:
Ethylene: 21.7 Wt.%
Benzene: 6.9 Wt.%
Toluene: 4.4 Wt.%
$C_8$ Aromatics: 2.7 Wt.%

The recovered +550° F. heavy fuel oil is reduced to 12.5 Wt.%.

Example 4

The same Nigerian gas oil as used in example 1 was hydrotreated over a nickel molybdate on alumina catalyst with the catalyst loaded with a halogenated promoter such that the catalyst contained 4.4 Wt.% of chlorine. The operating conditions for the hydrotreating were as follows:
Total pressure: 950 psig
Liquid hourly space velocity: 1.0
$H_2$/Oil SCR/ggl: 2500
Reactor average temp.: 685° F.
$CCl_4$ in feed, wt%. 0.5

The hydrotreated gas oil recovered has inspections as shown under column IV of Table I. Compared with Example 2 and 3, the product has the greatest paraffin and lowest polynuclear aromatics contents.

The recovered hydrotreated gas oil is then pyrolyzed at a steam dilution of 1:1 by weight at the maximum severity. From the pyrolysis coil, the following valuable products are obtained:
Ethylene: 21.8 Wt.%
Benzene: 6.9 Wt.%
Toluene: 4.4 Wt.%
$C_8$ Aromatics: 2.7 Wt.%

The recovered +550° F. heavy fuel oil is 12.5 Wt.%
The above examples show the advantages for using the promoter during hydrotreating.

TABLE I

| | | ANALYTICAL INSPECTIONS OF FEED AND PRODUCTS | | | |
|---|---|---|---|---|---|
| | | I RAW NIG. GAS OIL | II STRAIGHT HYDROTREATING | III "PROMOTED" FEED RUNS (Ni—Mo Cat.) | IV |
| | | FEED 0.8540 | PRODUCTS (NI—MO Cat.) 0.8443 | 0.1 W% $CCl_4$ 0.8378 | 0.5 W% $CCl_4$ 0.8319 |
| | Sp. Gravity | SRGO-4 | HH-1 | HTA-P-101 | HTA-P-102 |
| ASTM DIST., (1) | Vol. % | °F. | °F. | °F. | °F. |

TABLE I-continued

ANALYTICAL INSPECTIONS OF FEED AND PRODUCTS

| | | I<br>RAW NIG.<br>GAS OIL<br>FEED<br>0.8540<br>SRGO-4 | II<br>STRAIGHT<br>HYDROTREATING<br>PRODUCTS (NI—MO Cat.)<br>0.8443<br>HH-1 | III<br>"PROMOTED" FEED RUNS (Ni—Mo Cat.) | IV |
|---|---|---|---|---|---|
| Sp. Gravity | | | | 0.1 W% CCl₄<br>0.8378<br>HTA-P-101 | 0.5 W% CCl₄<br>0.8319<br>HTA-P-102 |
| | TEP | 364 | 340 | 221 | 210 |
| | 5% | 439 | 419 | 364 | 290 |
| | 10% | 476 | 460 | 427 | 364 |
| | 30% | 528 | 514 | 505 | 492 |
| | 50% | 556 | 545 | 540 | 534 |
| | 70% | 582 | 572 | 569 | 565 |
| | 90% | 624 | 615 | 611 | 608 |
| | E. P. | 671 | 656 | 659 | 653 |
| MASS SPECT. WT. % | | | | | |
| Paraffins | | 41.6 | 42.5 | 47.2 | 48.7 |
| Cycloparaffins | | 9.8 | 12.1 | 16.1 | 13.7 |
| Alkylbenzenes | | 3.8 | 4.9 | 3.5 | 4.3 |
| Indanes/Tetralins | | 6.6 | 10.6 | 8.5 | 8.0 |
| Indenes | | 3.0 | 3.0 | 2.5 | 1.9 |
| Naphthalenes | | 6.9 | 2.3 | 2.0 | 1.7 |
| Dicycloparaffins | | 13.0 | 14.1 | 12.5 | 13.3 |
| Acenaphthenes | | 4.6 | 2.1 | 1.7 | 1.7 |
| Fluorenes | | 2.6 | 1.3 | 0.7 | 0.7 |
| Tricyclic Aromatics | | 2.1 | 1.0 | 0.5 | 0.6 |
| Tricycloparaffins | | 6.0 | 6.1 | 4.8 | 5.4 |
| TOTALS | | 100.0 | 100.0 | 100.0 | 100.0 |
| polynuclear Aromatics, Wt. % | | 19.2 | 9.7 | 7.4 | 6.6 |

Numerous modifications and variations of the present invention are possible in light of the above teachings and, therefore, within the scope of the appended claims the invention may be practised otherwise than as particularly described.

What is claimed is:

1. In a process for pretreating a feed for the subsequent production of light olefins and mononuclear aromatics by thermal cracking wherein the feed is catalytically hydrotreated without excessive hydrocracking and gas production, the improvement comprising:

said hydrotreating being effected at a temperature of from 640° F. to 950° F. and a pressure of from 750 to 2500 psig, in the presence of a catalyst containing at least one group VI metal selected from the group consisting of tungsten and molybdenum and at least one group VIII metal selected from the group consisting of nickel and cobalt, said catalyst being promoted with at least 0.5 weight% of a member selected from the group consisting of fluorine, chlorine and mixtures thereof to thereby alter the feed to increase the yield of light olefins and mononuclear aromatics in the subsequent thermal cracking thereof.

2. The process of claim 1 wherein the catalyst is promoted with chlorine.

3. The process of claim 2 wherein the feed has an initial boiling point of at least 350° F. and end point of no greater than 1100° F.

4. The process of claim 3 wherein the hydrotreating is effected at a temperature of from 650° F. to 750° F. and a pressure of from 900 to 1500 psig.

5. The process of claim 4 wherein a chloro-substituted hydrocarbon is included in the feed to maintain said catalyst promoted with chlorine.

6. The process of claim 3 wherein the hydrotreated feed contains a 400° to 800° F. fraction in an amount which is no less than 85% of the amount of the 400° to 800° F. fraction present in the feed.

7. The process of claim 6 wherein said catalyst contains at least 1 weight % of chlorine and no greater than 10 weight % of chlorine.

8. The process of claim 7 wherein the hydrotreating is effected with hydrogen in an amount of from 1000 to 15,000 SCF/bbl, and the liquid hourly space velocity is from 0.5 to 3.0 V/H/V.

9. The process of claim 1 wherein the catalyst is promoted with fluorine.

10. The process of claim 9 wherein the feed has an initial boiling point of at least 350° F. and end point of no greater than 1100° F.

11. The process of claim 10 wherein the hydrotreated feed contains a 400° to 800° F. fraction in an amount which is no less than 85% of the amount of the 400° to 800° F. fraction present in the feed.

12. The process of claim 6 wherein the feed is a gas oil fraction.

* * * * *

UNITED STATES PATENT OFFICE
CERTIFICATE OF CORRECTION

Patent No. 4,181,601          Dated   January 1, 1980

Inventor(s)   MORGAN C. SZE

It is certified that error appears in the above-identified patent and that said Letters Patent are hereby corrected as shown below:

In the Specification:

Column 3,      TABLE I, line 66, under column II, "HH-1" should be --HT-1--

Column 4,      TABLE I - continued - under column II, "HH-1" should be --HT-1--

Column 4,      TABLE I - continued -under Sp.Gravity, "TEP" should be --IBP--

Signed and Sealed this

Ninth Day of December 1980

[SEAL]

Attest:

SIDNEY A. DIAMOND

Attesting Officer          Commissioner of Patents and Trademarks